F. B. COREY.
METHOD OF PRODUCING COMPOUND METAL OBJECTS.
APPLICATION FILED MAR. 2, 1916.

1,193,667.

Patented Aug. 8, 1916.

Witnesses,
Dorthea Atwell
Chas. H. Bree

Inventor,
Fred B. Corey.

UNITED STATES PATENT OFFICE.

FRED B. COREY, OF EDGEWOOD PARK, PENNSYLVANIA.

METHOD OF PRODUCING COMPOUND METAL OBJECTS.

1,193,667.  Specification of Letters Patent.  Patented Aug. 8, 1916.

Application filed March 2, 1916. Serial No. 81,662.

*To all whom it may concern:*

Be it known that I, FRED B. COREY, a citizen of the United States, residing at Edgewood Park, in the county of Allegheny and State of Pennsylvania, have invented a certain new and useful Method of Producing Compound Metal Objects, of which the following is a specification.

My invention relates to processes for uniting bodies of unlike metals and especially to processes in which the said unlike metals are firmly united by a weld that will resist the action of both temperature changes and mechanical stresses.

My invention is of particular value in uniting iron or steel to copper or copper alloys.

The objects of my invention are to provide means for uniting unlike metals to form compound bars, ingots and other bimetallic structures of whatever form and to produce a perfectly welded union between the joined surfaces of the two unlike metals, so that the resulting metallic structure may be rolled, drawn, hammered, bent, twisted, punched or machined without destroying the said union and to produce this union in a manner that will avoid absorption of one of the unlike metals by the other metal.

My invention consists in thoroughly coating the cleaned surface of one of the unlike metals with a thin welded-on layer of a metal of low melting point, in wiping off or otherwise removing any excess of such metal of low melting point, in bringing the coated surface into intimate contact with a clean surface of the second unlike metal and in then heating the whole structure to a temperature at which an alloy is formed by the said metal of low melting point and the said second unlike metal until the said metal of low melting point is thoroughly merged into the structure of the said second metal, this alloying temperature being below the melting point of either of the said unlike metals.

As this method is especially applicable to the welding of iron or steel to copper or copper alloys for various electrical purposes, I will describe its application to those metals, it being understood that the method is essentially the same whatever metals be used.

Figure 1:
Figure 2:
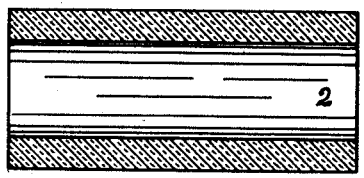
Figure 3:
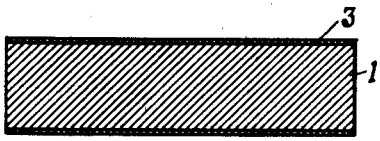
Figure 4:
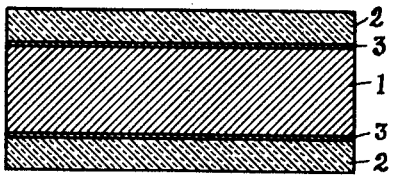
Figure 5:
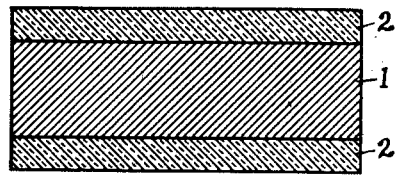
Figure 6:
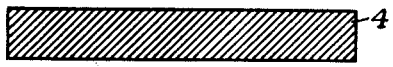
Figure 7:
Figure 8:
Figure 9:
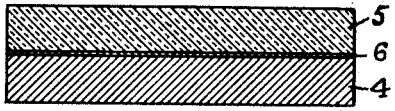
Figure 10:

In the drawings which illustrate my invention Figure 1 represents a cylindrical bar of iron or steel around which it is desired to weld a hollow cylindrical sleeve or tube of copper or copper alloy. Fig. 2 shows a longitudinal sectional view of a hollow cylindrical sleeve of copper or copper alloy such as may be welded over the bar shown in Fig. 1. Fig. 3 is a longitudinal sectional view of the bar shown in Fig. 1 after the cylindrical surface has been thinly coated with metal of low melting point. Fig. 4 is a longitudinal sectional view of the thinly coated bar and the sleeve of copper or copper alloy after they have been assembled together. Fig. 5 is a view similar to Fig. 4 after the thin layer of metal of low melting point has been alloyed with the copper or copper alloy. Fig. 6 is a sectional view of a flat bar of steel or iron and Fig. 7 is a similar view of a flat bar of copper or copper alloy that may be welded together by my improved process. Fig. 8 is a sectional view of the bar shown in Fig. 6 after its upper surface has been thinly coated with a layer of metal of low melting point. Fig. 9 is a sectional view of the thinly coated bar shown in Fig. 8 after it has been assembled with the bar shown in Fig. 7. Fig. 10 is a view similar to Fig. 9 after the thin layer of metal of low melting point has been alloyed with the copper or copper alloy. In Figs. 3, 4, 8 and 9 the thickness of the coating of metal of low melting point is greatly magnified for clearness.

Referring to Figs. 1 to 5 inclusive, 1 designates a cylindrical bar of iron or steel around which the sleeve or tube 2 is to be welded and 3 designates a thin layer of metal of low melting point which is firmly welded to the bar 1. In like manner, referring to Figs. 6 to 10 inclusive, 4 designates a flat bar of iron or steel to which the flat bar 5 of copper or copper alloy is to be welded and 6 designates a thin layer of metal of low melting point firmly welded to the flat bar 4.

The operation of my invention is as follows, reference being first made to Figs. 1 to 5 inclusive: The iron or steel bar 1 is thoroughly cleaned and the surface that is to be welded to the copper or copper alloy is then covered with a firm coating 3 of metal of low melting point. For this purpose I prefer an alloy of tin and lead. This alloy may be made of equal parts of tin and lead or the proportion may be varied through wide limits or one of the metals can be used alone. The coating may be applied by dipping in a bath of metal or by means of a soldering iron or by any of the well known soldering or tinning processes, using as a flux a solution of zinc chlorid or any of the commercial "soldering acids" or fluxes. While the metal of low melting point is still hot, the superfluous metal should be wiped off, leaving the iron bar 1 with an extremely thin layer 3 of metal firmly united thereto. The bar 1 with its coating 3 as shown in Fig. 3 may then be allowed to cool. The bore of the tube 2 is made slightly smaller than the outside diameter of the bar 1. The tube 2 of copper or copper alloy is then heated in such a manner that its interior surface is kept clean and free from oxid. To accomplish this result I prefer to heat the tube 2 by placing it in a bath of molten potassium chlorid, although other means to produce this result may be used. When the tube 2 is hot the bar 1 is pressed into the interior of the tube 2. The tube 2 contracts as it gives up its heat to the bar 1 and at the same time the bar 1 expands, thus bringing the surfaces into very close contact. The whole structure is then heated to such a temperature, below the melting point of the copper or copper alloy, that the coating 3 forms an alloy with the metal of the tube 2 and is absorbed by it, making a perfectly welded joint as indicated in Fig. 5. As the amount of metal in the coating is extremely small, this alloying process does not change to any perceptible degree the characteristics of the copper or copper alloy.

A structure such as is shown in Fig. 5 is largely used for the production of copper clad wire and rods. When such wire is required for electrical purposes it is highly important to secure the maximum degree of conductivity with a given percentage of copper used. Very small proportions of certain metals or impurities may cause a great reduction in the conductivity of the metal. For such work it is essential to form the tube 2 of pure electrolytic copper and the thin coating 3 should preferably have a large percentage of lead, as it has been determined that 0.1 per cent. of lead increases the conductivity of the copper about 4 per cent., while an equal percentage of tin reduces the conductivity by an approximately equal amount. A very thin coating composed of equal parts of lead and tin has practically no effect on the conductivity of the copper after the welding process has been completed.

The temperature used to alloy the coating with the copper or copper alloy should be as high as possible without danger of melting the copper containing metal. In welding copper to steel I have secured very good results with a temperature of about 900 degrees centigrade.

Referring now to Figs. 6 to 10 inclusive, the operation of welding flat bars is as follows: The surface of the iron or steel bar 4 to which the copper or copper alloy is to be welded is first thoroughly cleaned and this surface is then covered with a very thin welded-on coating of metal of low melting point by the use of a proper flux as previously described. The bar 5 of copper or copper alloy is heated and thoroughly cleaned by immersion in melted potassium chlorid or by other means and the surfaces of the bars 4 and 5 are then placed in contact and securely clamped or otherwise held in very intimate contact. When the surfaces of the bars 4 and 5 are pressed together, the molten flux on the bar 5 will be expelled from the joint without permitting the entrance of air to the surfaces to be welded. The whole structure is then heated to such a temperature that the coating 6 forms an alloy with the metal of the bar 5, thus producing a perfectly welded union between the bars 4 and 5 as shown in Fig. 10. A structure such as that shown in Fig. 10 is suitable for a billet from which copper covered steel sheets are to be rolled.

By the process above described I have welded steel and iron to pure copper and have also welded steel and iron to phosphor bronze and other alloys containing high percentages of copper. After such welding it is impossible to separate the two metals even when the parts are raised to a bright red heat. Attempts to separate the two metals by force may result in the breakage of the copper or copper alloy but will not cause a separation of the two metals at the welded surface.

It is my desire to distinguish clearly between my improved process and the various processes of soldering or brazing. In all soldering or brazing processes, the metals of higher melting points are united to a welded-on layer of a metal of lower melting point. The distinguishing characteristic of the soldered or brazed joint is the fact that when such a joint is heated to a temperature above the melting point of the soldering or brazing metal the parts that were united thereby can be easily separated. In my improved process, the thin layer of metal of low melting point is wholly alloyed with a metal of high melting point at a temperature only slightly below the melting point of the latter metal and when such alloy is formed the layer of metal of low melting point entirely disappears. Therefore, the distinguishing characteristic of my improved welded joint is the fact that the joint so formed remains strong even when the structure is heated to a temperature greatly above the melting point of the metal of low melting point which is used in making the joint. For example; if a bar of copper is soldered or "sweat" to a bar of steel, the joint can be separated at the melting temperature of the solder. In like manner, a bar of iron brazed to a bar of steel or nickel can be separated therefrom at the melting temperature of the brazing metal. If, however, a bar of copper be joined to a bar of steel by means of a thin film of solder in accordance with my improved process, the joint can not be separated even at a bright red heat. In this latter case the thin film of solder no longer exists in the completed joint as it has become completely alloyed with the copper which, in the alloying process, has become securely welded to the steel.

What I claim as new and desire to secure by Letters Patent of the United States is—

1. The process of producing compound bodies of unlike metals welded together, which consists in coating one metal body with metal of low melting point and in subsequently eliminating the said coating by alloying the said coating with a second metal body.

2. The process of producing compound bodies of unlike metals welded together, which consists in coating one metal body of high melting point with metal of low melting point and in subsequently eliminating the said coating by alloying the said coating with a second metal body of high melting point.

3. The process of producing compound bodies of unlike metals welded together, which consists of coating one metal body with metal of low melting point and in subsequently eliminating the said coating by alloying the said coating with a second metal body at a temperature below the melting point of the second metal body.

4. The process of producing compound bodies of ferrous and non-ferrous metals welded together, which consists in coating a ferrous metal body with metal of low melting point and in subsequently eliminating the said coating by alloying the said coating with a non-ferrous metal body.

5. The process of producing compound bodies of ferrous and non-ferrous metals welded together, which consists in coating a ferrous metal body with metal of low melting point and in subsequently eliminating the said coating by alloying said coating with a non-ferrous metal body at a temperature below the melting point of the said non-ferrous metal body.

6. The process of producing compound bodies of ferrous and non-ferrous metals welded together, which consists in coating a ferrous metal body with a soft metal of the tin group and in subsequently eliminating the said coating by alloying said coating with a non-ferrous metal body at a temperature below the melting point of the said non-ferrous metal.

7. The process of producing compound bodies of ferrous and non-ferrous metals welded together, which consists in applying to a ferrous metal body a coating containing metals of the tin group and in subsequently eliminating the said coating by alloying said coating with a non-ferrous metal body at a temperature below the melting point of the said non-ferrous metal.

8. The process of producing compound bodies of unlike metals welded together, which consists in applying to an iron or steel body a thin welded coating of soft metal containing lead and tin and in subsequently eliminating the said coating by alloying the said coating with a non-ferrous metal body at a temperature below the melting point of said non-ferrous metal body.

9. The process of producing compound bodies of unlike metals welded together, which consists in coating a steel core with a tin-lead alloy, in forcing the coated core into a copper tube and in eliminating the said coating by alloying the said coating with the said copper tube at a temperature below the melting point of said tube.

10. The process of producing compound bodies of unlike metals welded together, which consists in coating a steel core with a tin-lead alloy, in forcing the coated core into a copper tube previously heated in a bath of potassium chlorid and in subsequently eliminating the said coating by alloying the said coating with the said copper tube at a temperature below the melting point of said tube.

In witness whereof I have set my hand this first day of March, 1916.

FRED B. COREY.

Witnesses:
M. MENDEL,
CHAS. H. BELL.